(12) United States Patent
Muratsu et al.

(10) Patent No.: US 12,712,235 B2
(45) Date of Patent: Aug. 18, 2026

(54) BATTERY MODULE COMPRISING A CELL INTERCONNECT FOR CELLS COMPRISING TERMINALS POSITIONED ON A SAME SIDE

(71) Applicant: Panasonic Intellectual Property Management Co., Ltd., Osaka (JP)

(72) Inventors: Jiro Muratsu, Osaka (JP); Shinya Geshi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 18/733,298

(22) Filed: Jun. 4, 2024

(65) Prior Publication Data

US 2024/0322350 A1 Sep. 26, 2024

Related U.S. Application Data

(63) Continuation of application No. 16/639,692, filed as application No. PCT/JP2018/032520 on Sep. 3, 2018.

(30) Foreign Application Priority Data

Sep. 20, 2017 (JP) ................................ 2017-180302

(51) Int. Cl.
*H01M 50/298* (2021.01)
*H01M 50/179* (2021.01)
(Continued)

(52) U.S. Cl.
CPC ....... *H01M 50/298* (2021.01); *H01M 50/179* (2021.01); *H01M 50/213* (2021.01);
(Continued)

(58) Field of Classification Search
CPC .. H01M 50/522; H01M 50/55; H01M 50/213; H01M 50/298; H01M 50/559; H01M 50/503; H01M 50/179
See application file for complete search history.

(56) References Cited

U.S. PATENT DOCUMENTS

2011/0076521 A1 3/2011 Shimizu et al.
2011/0223468 A1 9/2011 Ferber, Jr.
(Continued)

FOREIGN PATENT DOCUMENTS

CN 102896416 A 1/2013
CN 106169546 A * 11/2016 .......... H01M 10/625
(Continued)

OTHER PUBLICATIONS

EPO machine generated English translation of CN-106169546-A (Year: 2016).*

(Continued)

*Primary Examiner* — Kimberly Wyluda
(74) *Attorney, Agent, or Firm* — RIMON P.C.

(57) ABSTRACT

A battery module includes: cells, wherein each of the cells including a positive electrode terminal and a negative electrode terminal disposed on one end part, the one end parts being positioned on a same side, and a battery block is constituted by a row of the plurality of cells. The battery module further includes a plate disposed above the one end parts of the cells being arranged, and the plate includes: holes through which the positive electrode terminal and the negative electrode terminal are exposed; and a plurality of conductive members disposed on a surface. The plurality of conductive members extend along the row, two of the plurality of conductive members are disposed in the battery block, and each of the plurality of conductive members includes terminal connecting parts connected through the holes to the terminals of a same pole.

4 Claims, 10 Drawing Sheets

(51) Int. Cl.

| | |
|---|---|
| ***H01M 50/213*** | (2021.01) |
| ***H01M 50/503*** | (2021.01) |
| ***H01M 50/522*** | (2021.01) |
| ***H01M 50/55*** | (2021.01) |
| ***H01M 50/559*** | (2021.01) |

(52) U.S. Cl.

CPC ....... *H01M 50/503* (2021.01); *H01M 50/522* (2021.01); *H01M 50/55* (2021.01); *H01M 50/559* (2021.01)

(56) References Cited

U.S. PATENT DOCUMENTS

| | | | | |
|---|---|---|---|---|
| 2011/0223776 | A1 | 9/2011 | Ferber, Jr. | |
| 2012/0135296 | A1 | 5/2012 | Itoi et al. | |
| 2013/0029206 | A1 | 1/2013 | Lev | |
| 2013/0202941 | A1 | 8/2013 | Ono et al. | |
| 2014/0234683 | A1 | 8/2014 | Sweney | |
| 2014/0255748 | A1 | 9/2014 | Jan et al. | |
| 2014/0356723 | A1 | 12/2014 | Suehiro | |
| 2015/0179995 | A1 | 6/2015 | Nakamura | |
| 2016/0181579 | A1 | 6/2016 | Geshi | |
| 2017/0077487 | A1 | 3/2017 | Coakley et al. | |
| 2017/0256770 | A1 | 9/2017 | Wynn et al. | |
| 2018/0108896 | A1* | 4/2018 | Fees | H01M 50/502 |
| 2018/0287104 | A1 | 10/2018 | Urushihara | |
| 2018/0351206 | A1 | 12/2018 | Kim | |
| 2019/0097190 | A1 | 3/2019 | Seol | |
| 2019/0280267 | A1* | 9/2019 | Bae | H01M 10/6556 |
| 2020/0212380 | A1* | 7/2020 | Kwag | H01M 50/50 |
| 2022/0320689 | A1* | 10/2022 | Muratsu | H01G 11/10 |

FOREIGN PATENT DOCUMENTS

| | | | |
|---|---|---|---|
| JP | 2011-076936 | A | 4/2011 |
| JP | 2013-073929 | A | 4/2013 |
| JP | 2015-099726 | A | 5/2015 |
| JP | 2016-516273 | A | 6/2016 |
| WO | 2011/151981 | A1 | 12/2011 |
| WO | 2017/062886 | A1 | 4/2017 |

OTHER PUBLICATIONS

English Translation of Chinese Office Action dated Jan. 18, 2022 for the related Chinese Patent Application No. 201880053649.6.

International Search Report of PCT application No. PCT/JP2018/032520 dated Oct. 30, 2018.

English Translation of Chinese Office Action dated Aug. 11, 2022 for the related Chinese Patent Application No. 201880053649.6.

Non-Final Rejection issued in U.S. Appl. No. 16/639,692, dated Oct. 22, 2021.

Final Rejection issued in U.S. Appl. No. 16/639,692, dated May 3, 2022.

Non-Final Rejection issued in U.S. Appl. No. 16/639,692, dated Aug. 16, 2022.

Final Rejection issued in U.S. Appl. No. 16/639,692, dated Mar. 8, 2023.

Non-Final Rejection issued in U.S. Appl. No. 16/639,692, dated Jul. 27, 2023.

Notice of Allowance issued in U.S. Appl. No. 16/639,692, dated Nov. 14, 2023.

Notice of Allowance issued in U.S. Appl. No. 16/639,692, dated Mar. 5, 2024.

Non-Final Office Action dated Aug. 23, 2024 issued in U.S. Appl. No. 16/639,692.

Final Office Action dated Jan. 28, 2026 issued in the related U.S. Appl. No. 16/639,692.

Non-Final Office Action dated Jun. 27, 2025 issued in related U.S. Appl. No. 16/639,692.

* cited by examiner

BATTERY MODULE COMPRISING A CELL INTERCONNECT FOR CELLS COMPRISING TERMINALS POSITIONED ON A SAME SIDE

CROSS-REFERENCE TO RELATED APPLICATIONS

This application is a Continuation of U.S. patent application Ser. No. 16/639,692, filed on Feb. 17, 2020, which is the U.S. National Phase under 35 U.S.C. § 371 of International Application No. PCT/JP2018/032520, filed on Sep. 3, 2018, which claims the benefit of foreign priority to Japanese Patent Application No. 2017-180302 filed on Sep. 20, 2017, the entire contents of each of which are hereby incorporated by reference.

TECHNICAL FIELD

The present invention relates to a battery module including a plurality of cells.

BACKGROUND ART

In recent years, from the point of view of resource saving and energy saving, demand for secondary batteries such as nickel-hydrogen batteries, nickel-cadmium batteries, and lithium-ion batteries, which are reusable, has increased. Among those batteries, the lithium ion secondary battery has a feature that the battery is light in weight but has a high electromotive force and a high-energy density. Therefore, there is an increasing demand as a power source for driving various portable electronic devices and mobile communication devices such as portable telephones, digital cameras, video cameras, and laptop personal computers.

In the meanwhile, to reduce usage of fossil fuel and to reduce emission amount of $CO_2$, battery modules are increasingly expected as a power source for driving a motor of a vehicle or the like or a power source for home use or industrial use. A battery module can be exemplified as such a battery module, and, in order to achieve a desired voltage and capacity, the battery is configured with a plurality of battery assemblies each configured with a plurality of cells that are parallel connected and series connected. PTL 1 discloses such a battery module (battery pack), and the battery module includes a plurality of battery cells.

The battery cells have first terminals of the battery cells at first ends of the battery cells and have a part of a plurality of second terminals of the battery cells at the first ends of the battery cells. The first ends of the battery cells are disposed on the same plane. The battery module includes a plurality of bus bars that are provided near the first ends of the battery cells and are coupled to the first terminals and the part of the second terminals of the battery cells such that the battery cells are disposed in one of the following connection states: series connection; parallel connection; and series connection and parallel connection.

CITATION LIST

Patent Literature

PTL 1: Japanese Translation of PCT International Publication No. 2016-516273

SUMMARY OF THE INVENTION

However, in the battery module disclosed in PTL 1, connections between the terminals of battery cells and the bus bars are made by wire bonding, and time for connection work in a connection step is long; therefore, the cost is accordingly large. In addition, those bonding parts have the highest current densities and therefore function as fuses. However, because it is difficult to uniform lengths and thicknesses of the bonding wires in the battery module, the fuse characteristics cannot be stable.

The present invention has been made in view of such points, and an object of the present invention is to provide a battery module whose cells can be connected at low cost.

A battery module of the present invention has a configuration including: a plurality of cells, each of the plurality of cells including a positive electrode terminal and a negative electrode terminal disposed on one end part of the each of the plurality of cells, the plurality of cells being arranged in such a manner that a plurality of the one end parts are positioned on a same side, and a battery block is constituted by a row in which the plurality of cells are arranged in a line. The configuration further includes a plate disposed above the plurality of the one end parts of the plurality of cells being arranged, and the plate includes: holes that are provided in the plate and through each of which the positive electrode terminal and the negative electrode terminal of each of the plurality of cells are exposed; and a plurality of conductive members disposed on a surface opposite to a surface opposed to the plurality of cells. The plurality of conductive members extend along the row in which the plurality of cells of the battery block are arranged in a line, two of the plurality of conductive members are disposed in the battery block, and each of the plurality of conductive members includes terminal connecting parts connected through the holes to the terminals of a same pole of the individual cells included in the battery block.

In the battery module, the battery block may include a plurality of the rows in each of which the plurality of cells are arranged.

Each of the plurality of conductive members is made of a plate-shaped metallic material and may be made of a metal plate or metal foil.

Each of the plurality of terminal connecting parts may have a fuse function due to having a cross-sectional area of a current flow passage less than or equal to a predetermined area.

Three or more of the battery blocks are disposed adjacent to each other, and each of the plurality of conductive members disposed at a position other than an end may be connected to a plurality of the positive electrode terminals of the plurality of cells in one of the battery blocks, and may be connected to a plurality of the negative electrode terminals of the plurality of cells in another battery block.

According to the present invention, a plurality of conductive members are provided on a surface of a plate, and the conductive members are each connected to terminals of the same pole of the individual cells in a battery block, through holes provided in the plate. Therefore, it is possible to easily connect the same poles of the plurality of cells to each other with a simple structure.

BRIEF DESCRIPTION OF DRAWINGS

FIG. 8 is a plan view showing another example of the conductive members.

DESCRIPTION OF EMBODIMENTS

Hereinafter, exemplary embodiments of the present invention will be described in detail with reference to the drawings. The following description of the preferred exemplary embodiments are inherently only examples and are not intended to limit the present invention, applications of the present disclosure, or use of the present disclosure. In the following drawings, for the sake of simple description, components having substantially the same function are represented by the same reference marks.

First Exemplary Embodiment

Cell

Figure 1:
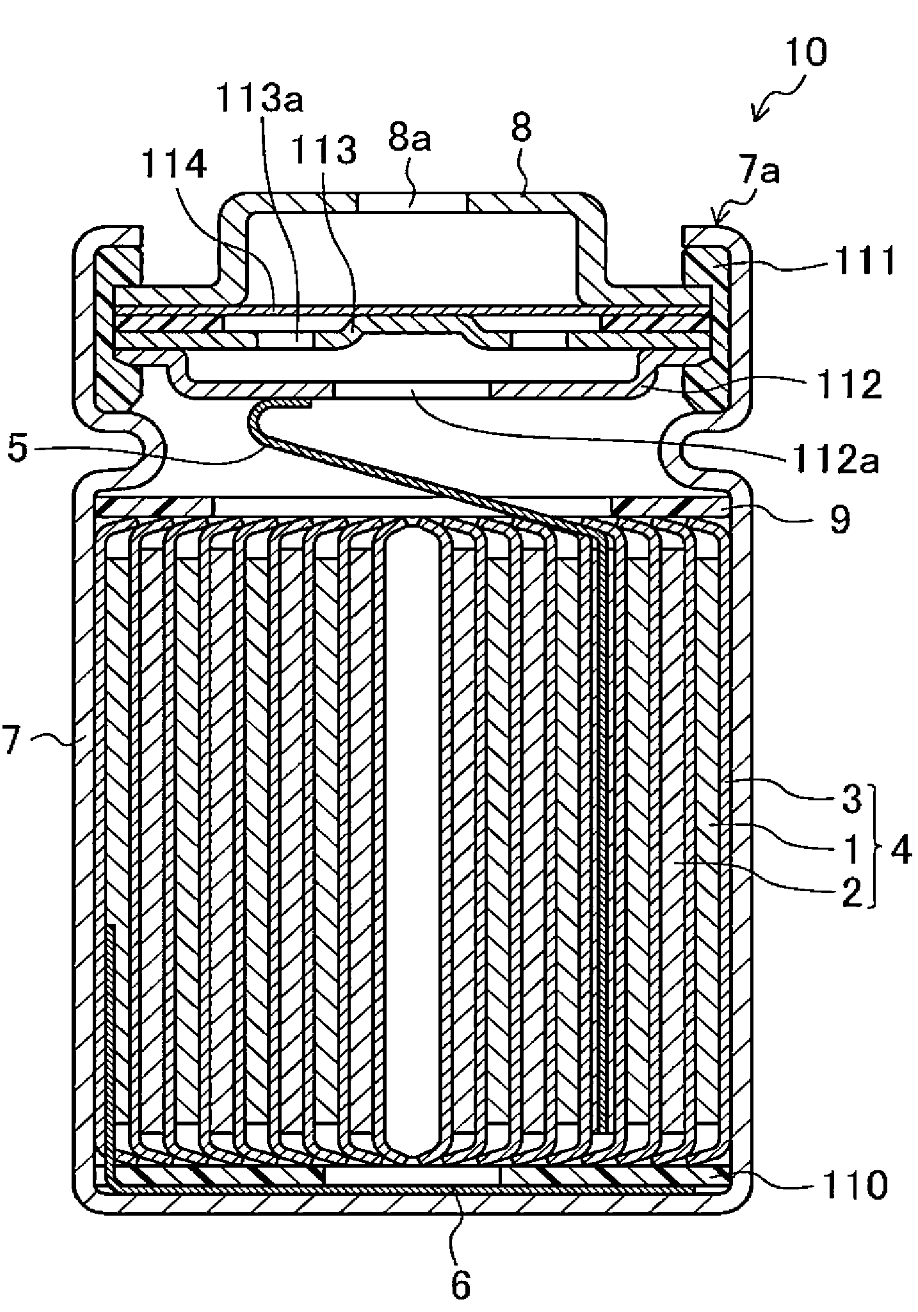
FIG. 1 is a schematic cross-sectional view of a cell.

FIG. 1 is a cross-sectional view schematically showing a configuration of cell 10 used for a battery module in a first exemplary embodiment of the present invention. Note that the battery used for the battery module of the present invention may be a battery that can also be used alone as a power source for a portable electronic device such as a laptop personal computer (hereinafter, a battery used for the battery module is referred to as "cell"). In this case, because a high-performance general-purpose battery can be used as a cell for a battery module, it is easier to achieve improvement in performance and reduction in cost of the battery module.

As cell 10 used for the battery module of the present invention, it is possible to employ a circular cylinder-shaped lithium ion secondary battery as shown in FIG. 1, for example. This lithium ion secondary battery has a normal configuration and has a safety mechanism that discharges a gas outside the battery if a pressure increases inside the battery due to generation of an internal short-circuit or other causes. Hereinafter, a specific configuration of cell 10 will be described with reference to FIG. 1.

As shown in FIG. 1, battery case 7 houses, together with a non-aqueous electrolyte, electrode group 4 in which positive electrode 2 and negative electrode 1 are wound with separator 3 between positive electrode 2 and negative electrode 1. On an upper side and lower side of electrode group 4, insulating plates 9 and 110 are respectively disposed. Positive electrode 2 is bonded to filter 112 via positive electrode lead 5, and negative electrode 1 is connected, via negative electrode lead 6, to a bottom part of battery case 7 that doubles as a negative electrode terminal.

Filter 112 is connected to inner cap 113, and a protrusion of inner cap 113 is bonded to metal valve plate 114. Further, valve plate 114 is connected to a terminal plate that doubles as positive electrode terminal 8. The terminal plate, valve plate 114, inner cap 113, and filter 112 form one body to seal an opening of battery case 7 via gasket 111. Note that battery case 7 is put also over an upper end of gasket 111 to push gasket 111 from above, so that battery case 7 firmly seals the opening of battery case 7. This upper end part (negative electrode terminal 7*a*), of battery case 7, put on the upper end of gasket 111 is positioned adjacent to the terminal plate (positive electrode terminal 8), which means that positive electrode terminal 8 and negative electrode terminal 7*a* are on an end part on one side (an upper side in the drawing) of a circular cylinder.

If an internal short-circuit or the like occurs in cell 10 to increase a pressure inside cell 10, valve body 114 is swelled toward the terminal plate, and when the bonding between inner cap 113 and valve body 114 comes off, a current path is shut off. If the pressure inside cell 10 further increases, valve body 114 is broken. This discharges a gas generated in cell 10 to outside via through hole 112*a* of filter 112, through holes 113*a* of inner cap 113, a crack of valve body 114, and open part 8*a* of the terminal plate.

Note that a safety mechanism for discharging the gas generated in cell 10 to outside is not limited to the structure shown in FIG. 1, and the safety mechanism may have another structure.

Battery Module

Figure 2:
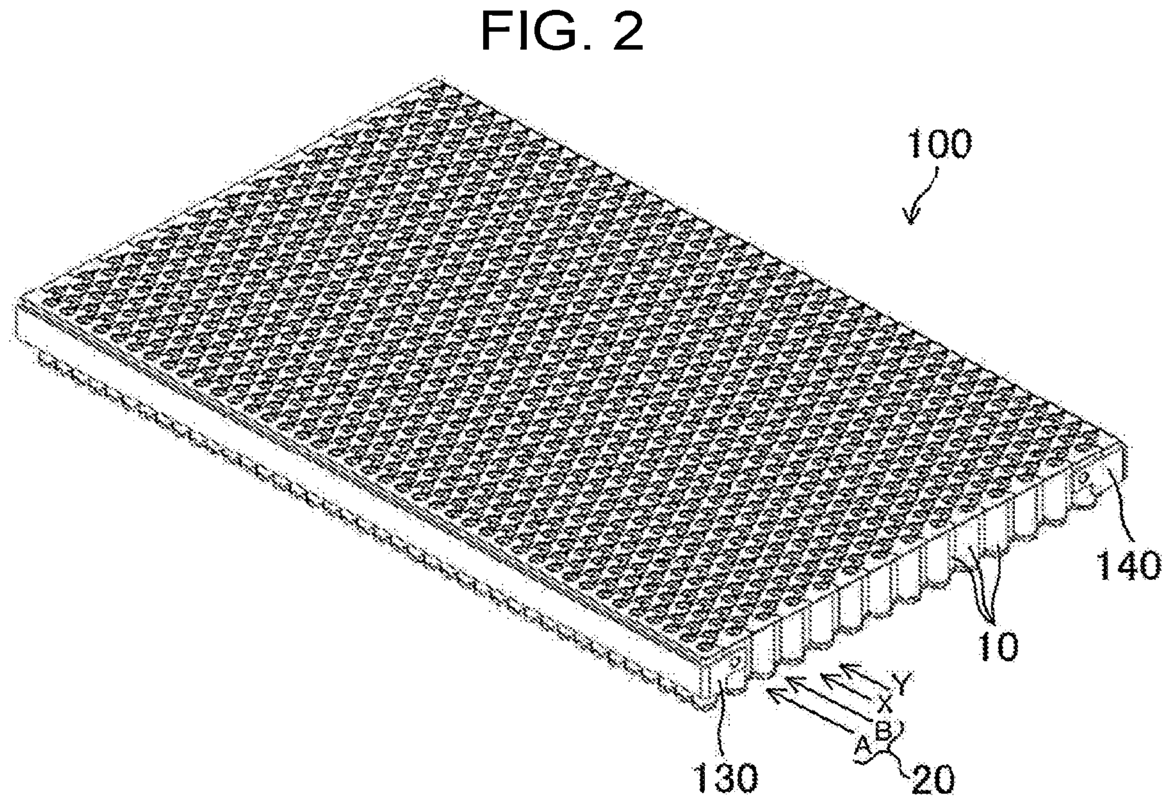
FIG. 2 is a schematic perspective view of a battery module according to an exemplary embodiment.
Figure 3:
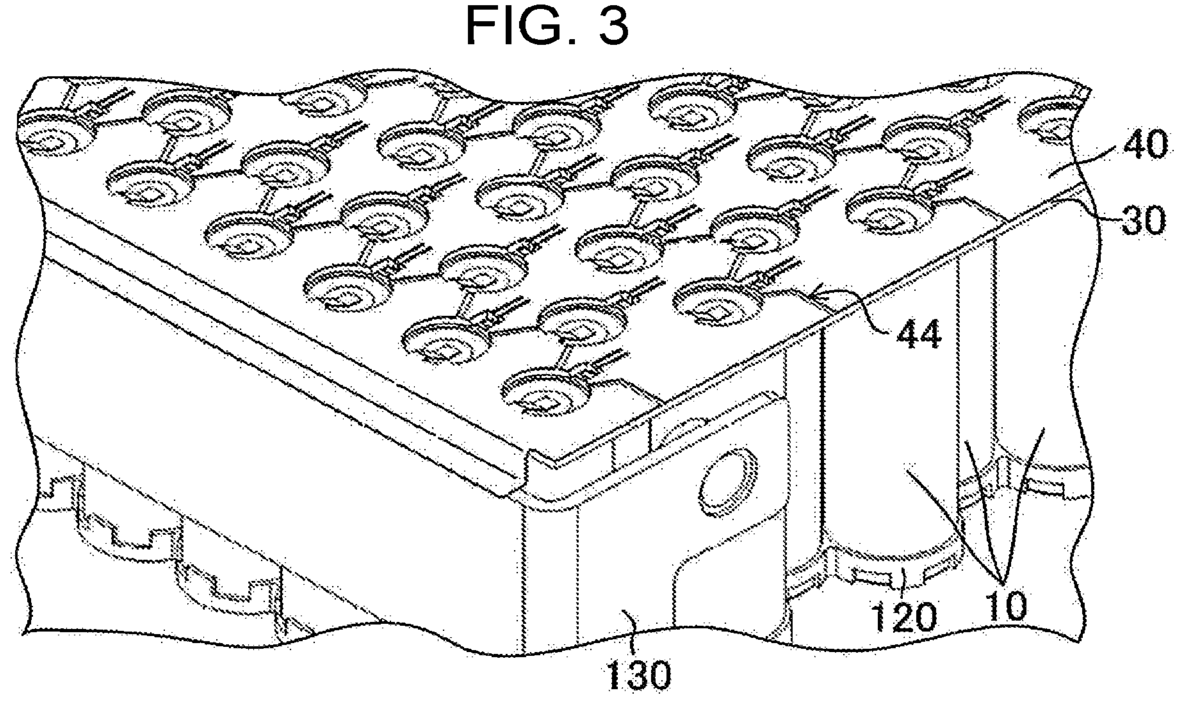
FIG. 3 is a partially enlarged view of the battery module according to the exemplary embodiment.
Figure 4:
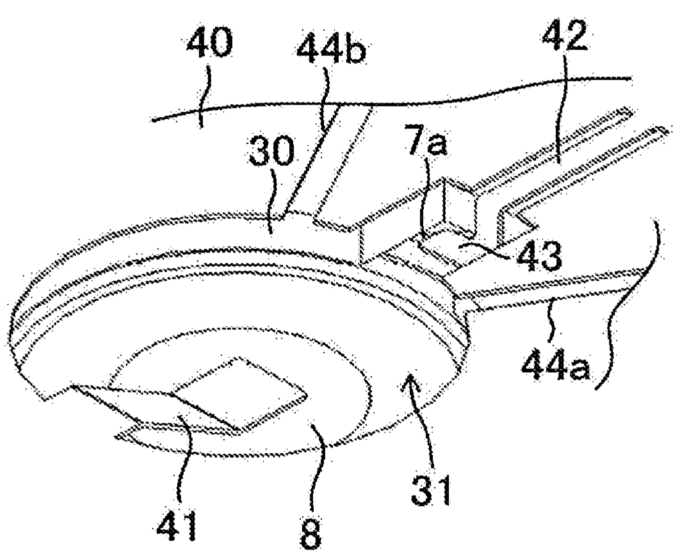
FIG. 4 is an enlarged view of one end side of the battery module according to the exemplary embodiment.

FIG. 2 is a schematic perspective view of battery module 100 according to the present exemplary embodiment. Note that this diagram shows an internal structure when a cover and the like are removed for description. FIG. 3 is a partially enlarged view of FIG. 2, and FIG. 4 is a partially enlarged view of positive electrode terminal 8 and negative electrode terminal 7*a* of one cell 10 in battery module 100.

In battery module 100, a plurality of cells 10, 10, . . . are arranged such that an end part of each cell 10, where positive electrode terminal 8 and negative electrode terminal 7*a* are disposed, is directed upward in FIG. 2. End parts on the other sides of cells 10, 10, . . . are fixed, being fit in battery holder 120.

Because cells 10, 10, , , , are most densely packed in battery module 100 with consideration of safety, so that cells 10, 10, . . . are arranged almost closely to form rows A, B, X, and Y. Two rows A and B constitute battery block 20. Next two rows X and Y constitute another battery block. These rows extend straight, and a plurality of rows are disposed adjacently parallel to each other. On the respective both ends of battery module 100, there are disposed a positive side electricity-collecting member and a negative side electricity-collecting member extending parallel to these rows, and positive-side outer-terminal connection part 130 and negative-side outer-terminal connection part 140 are each provided on an end part of each of the positive side electricity-collecting member and the negative side electricity-collecting member.

Above one end parts of cells 10, 10, . . . , insulating plate (electrically insulating plate) 30 is disposed. In insulating plate 30, there are provided holes 31 each of which corresponds to each cell 10. Holes 31 allow positive electrode terminals 8 and negative electrode terminals 7*a* of cells 10 to be exposed. On a surface of insulating plate 30 on the opposite side of a surface opposed to cells 10, there are provided conductive members 40 made of a metallic material. The plurality of conductive members 40 are on insulating plate 30, and individual members 40 are electrically separated by slits 44, 44*a*, and 44*b*.

Examples of a material for insulating plate 30 include a thin plate made of glass fibers solidified with an epoxy resin and a plate made of resin such as acrylic (PMMA) and polycarbonate (PC). Examples of a material for conductive members 40 include aluminum and copper.

Most of each part, on conductive member 40, opposed to each hole 31 is removed to make a hole similar to hole 31. However, positive electrode terminal connecting part 41 connected to positive electrode terminal 8 and negative electrode terminal connecting part 43 connected to negative electrode terminal 7*a* have shapes protruding in the hole of conductive member 40. Further, at an edge part of hole 31 of insulating plate 30, conductive member 40 has a shape hanging over hole 31. Since conductive members 40 have overhanging shapes, areas of conductive members 40 can be larger, and it is thus possible to increase an amount of electric current flowing through each conductive member 40. In addition, it is possible to increase surface areas of conductive members 40 and to thus increase amounts of heat dissipation.

Further, coupling part 42, of each negative electrode terminal connecting part 43, connected to a main body part of conductive member 40 has a narrow strip shape, and a current passing through this coupling part 42 is designed to have the highest current density per unit cross-sectional area in conductive member 40. That is, a flow passage cross-sectional area of the current flowing through coupling part 42 is set less than or equal to a predetermined area, and due to this design, coupling part 42 burns out when an overcurrent flows, which means that coupling part 42 takes a fuse function.

Conductive members 40 can be formed by laser cutting, etching, or the like. By using such processing, it is possible to reduce variations in shape, dimension, and cross-sectional area of each positive electrode terminal connecting part 41 and negative electrode terminal connecting part 43. Therefore, the current amount that burns out coupling part 42 of negative electrode terminal connecting part 43 can be set to a constant amount without variation for all coupling parts 42.

Figure 5:
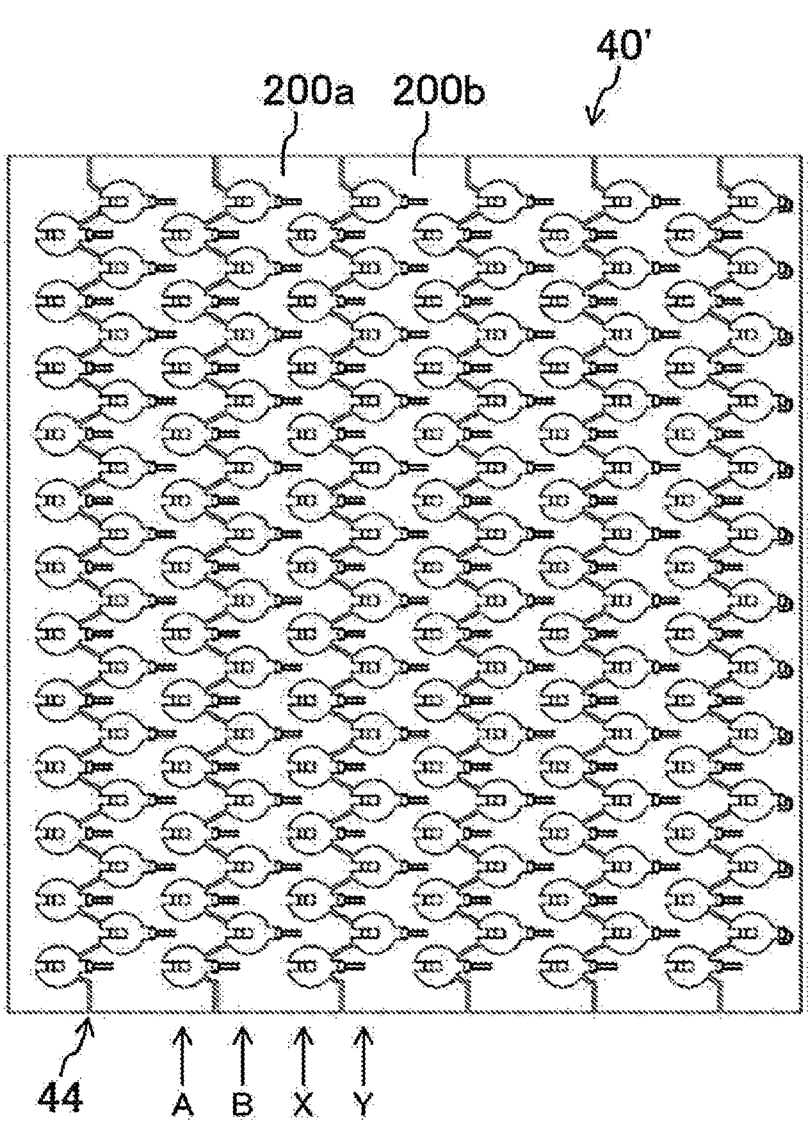
FIG. 5 is a plan view showing an example of conductive members.

FIG. 5 is a plan view entirely showing a plurality of conductive members 40', 200*a*, 200*b*, . . . , and a number of cells 10 is smaller than battery module 100 of FIG. 2 so that the drawing can be easily viewed and a description can be easily given. In the battery module that uses conductive members 40', 200*a*, 200*b*, . . . shown in FIG. 5, there are 12 cells 10, 10, . . . vertically arranged adjacent to each other to constitute one row, and there are 12 of such rows. Two of these rows constitute one battery block, and there are totally six battery blocks. Note that FIG. 5 does not show any cell 10, but a description will be made below on a battery module (having a plurality of cells 10) using conductive members 40', 200*a*, 200*b*, . . . shown in FIG. 5.

In the battery module using conductive member 40' shown in FIG. 5, row A and row B constitute a first battery block, and row X and row Y next to the first battery block constitute a second battery block. Each row is configured with 12 cells 10. Further, conductive members 40', 200*a*, 200*b*, . . . extend along the rows of cells 10.

In the first battery block configured with row A and row B, conductive member 200*a* connects the negative electrode terminals of all of the cells of rows A and B. In addition, conductive member 200*a* connects positive electrode terminals of all of the cells of rows X and Y in the second battery block configured with row X and row Y. That is, conductive member 200*a* parallel connects the negative electrodes of all of the cells of rows A and B, parallel connects the positive electrodes of all of the cells of rows X and Y, and, in addition, series connects the negative electrodes of all of the cells of rows A and B and the positive electrodes of all of the cells of rows X and Y. Regarding the conductive members, of the plurality of conductive members, disposed on the both ends, the conductive member on one end parallel connects only the positive electrode terminals of the battery block on one end side, and the conductive member on the other end parallel connects only the negative electrode terminals.

Further, with respect to the second battery block configured with row X and row Y, two conductive members are disposed. One is conductive member 200*a* to which the positive electrode terminals of all of the cells of row X and Y are connected, and the other is conductive member 200*b* to which the negative electrode terminals of all of the cells of rows X and Y are connected. Such a configuration is common to any of the battery blocks, and two conductive members are disposed for one battery block.

Therefore, the battery module shown in FIG. 5 has a configuration constituted by series-connected six battery blocks each of which is configured with parallel-connected 24 cells (12 batteries×2 rows). Further, to each of the positive side electricity-collecting member and the negative side electricity-collecting member each disposed on each of the both ends of the battery module, conductive members disposed on the both ends of the battery module are each electrically connected. Therefore, it is possible to output electric power of 24 parallel and 6 series cells from a positive-side outer-terminal connection part and a negative-side outer-terminal connection part each provided on each of the both ends of the battery module.

In the present exemplary embodiment, it is possible to collect electricity from the cells with a combination of an insulating plate having holes and conductive members made of metal foil; therefore, the structure is simple, and the manufacturing cost can be lowered. Further, since the conductive members are made of metal foil, the conductive members can be machined precisely at low cost by etching or other processing, and it is possible to reduce, in one battery module, variation in amount of fusing current of each part having a fuse function and being connected to each cell.

Further, one metal foil is used to connect to the terminals of the cells and to collect electricity, electricity can be collected with a small loss. Note that in a case where 18650 battery is used as each cell and an aluminum foil having a thickness of 150 μm is used as each conductive member, if the width of each coupling part is 1 mm, the width of each positive electrode terminal connecting part is 3 mm, and the minimum dimension between neighboring holes in the conductive member is 8 mm, current of 2 A can flow for each cell.

Further, when a pressure increases in a cell and a gas generated in the cell is discharged outside the cell, since a discharge outlet for the gas is closed only with the conductive member made of metal foil, the gas breaks the metal foil and easily exits; therefore, the pressure in the cell does not increase too high.

Because it is possible to relatively freely design forming positions and shapes of the positive electrode terminal connecting part and the negative electrode terminal connecting part, it is possible to design such that an internal short-circuit does not easily occur, and safety can thus be increased.

Since the positive electrode terminal connecting parts and the negative electrode terminal connecting parts are made of metal foil, it is possible to relatively easily and securely connect between the positive electrode terminal connecting parts and the positive electrode terminals and between the negative electrode terminal connecting parts and the negative electrode terminals, and a manufacturing cost can be accordingly lowered.

Second Exemplary Embodiment

In a second exemplary embodiment, there are used conductive members having different shapes from those in the first exemplary embodiment, but cells and the other parts are almost the same as in the first exemplary embodiment; therefore, the parts different from those in the first exemplary embodiment will be described below.

Figure 6:
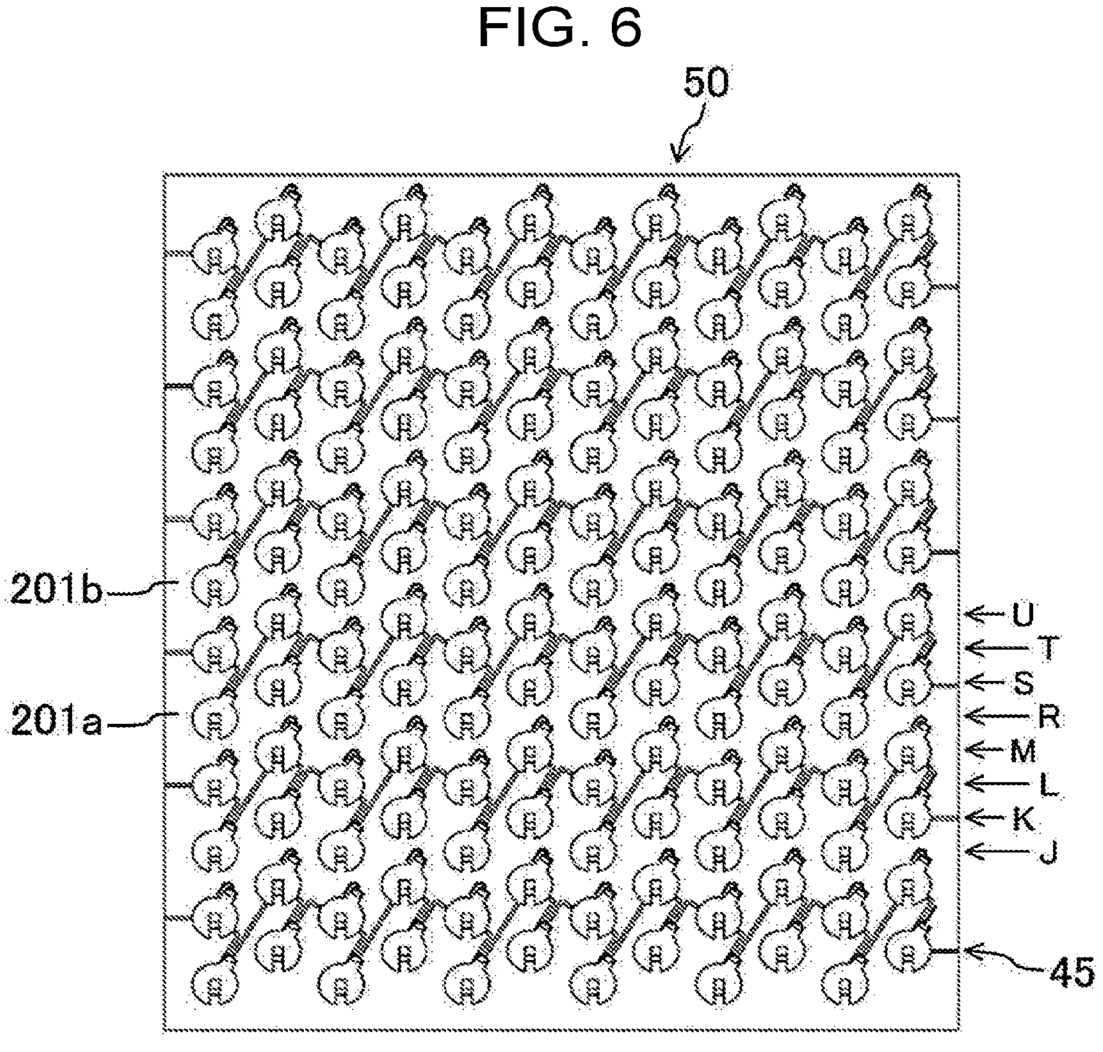
FIG. 6 is a plan view showing another example of the conductive members.

FIG. 6 shows conductive member 50, 201*a*, 201*b*, . . . according to the second exemplary embodiment. In the second exemplary embodiment, cells 10 are arranged in rows whose directions are different from the directions of the rows shown in the first exemplary embodiment by 90 degrees, and cells 10 are arranged in the lateral direction on the drawing. Cells 10 neighboring in each row are slightly apart from each other, and six cells 10, 10, . . . are arranged in each row. A number of the rows are 24.

In the present exemplary embodiment, there are formed a first battery block constituted by rows J, K, L, and M and a second battery block constituted by rows R, S, T, and U, and four rows of cells 10 constitute one battery block.

In the first battery block, conductive member 201*a* connects negative electrode terminals of all of the cells of four rows J, K, L, and M. Further, in the second battery block, conductive member 201*a* connects positive electrode terminals of all of the cells of four rows R, S, T, and U. Further, in the second battery block, conductive member 201*b* connects negative electrode terminals of all of the cells of four rows R, S, T, and U.

Further, although not shown in the drawing, in the present exemplary embodiment, positive side electricity-collecting members and negative side electricity-collecting members extend in the direction perpendicular to the direction in which the positive side electricity-collecting members and the negative side electricity-collecting members extend in the first exemplary embodiment.

The present exemplary embodiment also provides the same effects as the first exemplary embodiment.

Third Exemplary Embodiment

In a third exemplary embodiment, there are used conductive members having different shapes from those in the first exemplary embodiment, but cells and the other parts are the same as in the first exemplary embodiment; therefore, the parts different from those in the first exemplary embodiment will be described below.

Figure 7:
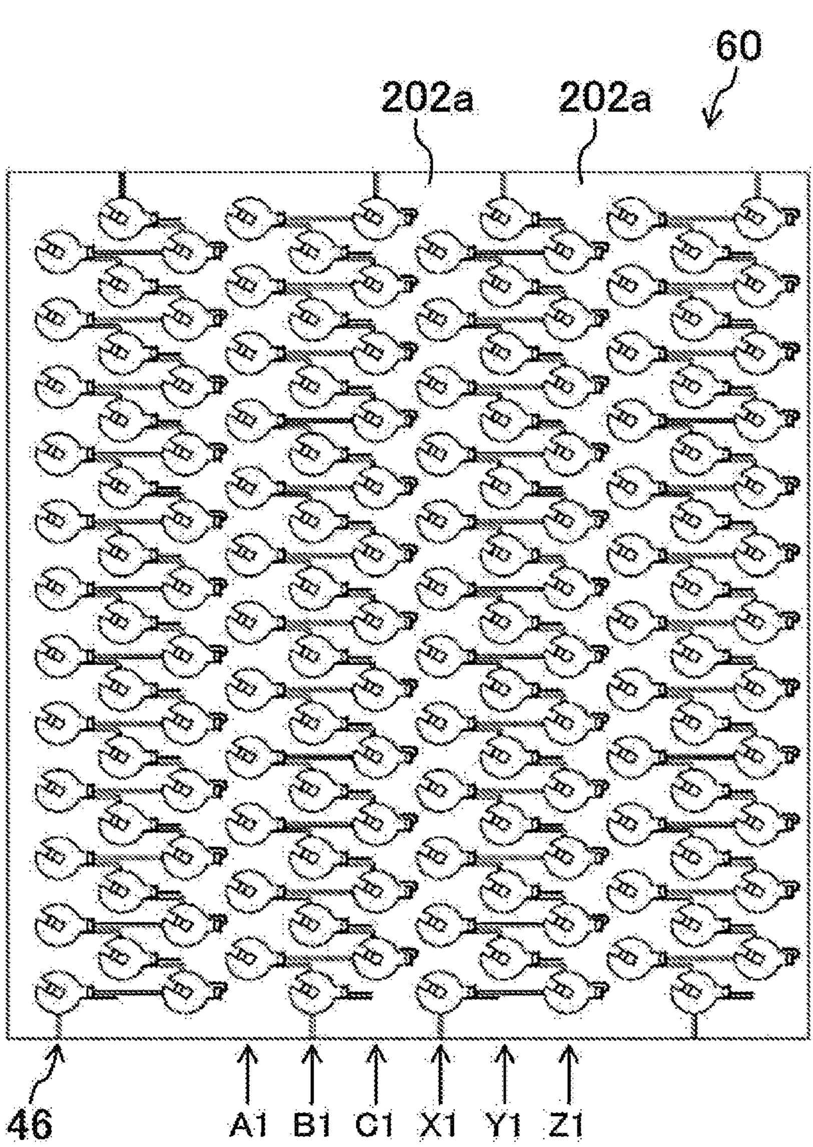
FIG. 7 is a plan view showing another example of the conductive members.

FIG. 7 shows conductive member 60, 202*a*, 202*b*, . . . according to the third exemplary embodiment.

In the present exemplary embodiment, there are formed a first battery block constituted by rows A1, B1, and C1 and a second battery block constituted by rows X1, Y1, and Z1, and three rows of cells 10 constitute one battery block.

In the first battery block, conductive member 202*a* connects negative electrode terminals of all of the cells of three rows A1, B1, and C1. Further, in the second battery block, conductive member 202*a* connects positive electrode terminals of all of the cells of three rows X1, Y1, and Z1. Further, in the second battery block, conductive member 202*b* connects negative electrode terminals of all of the cells of three rows X1, Y1, and Z1.

The present exemplary embodiment also provides the same effects as the first exemplary embodiment.

Fourth Exemplary Embodiment

In a fourth exemplary embodiment, there are used conductive members having different shapes from those in the second exemplary embodiment, but cells and the other parts are the same as in the second exemplary embodiment; therefore, the parts different from those in the second exemplary embodiment will be described below.

Figure 8:
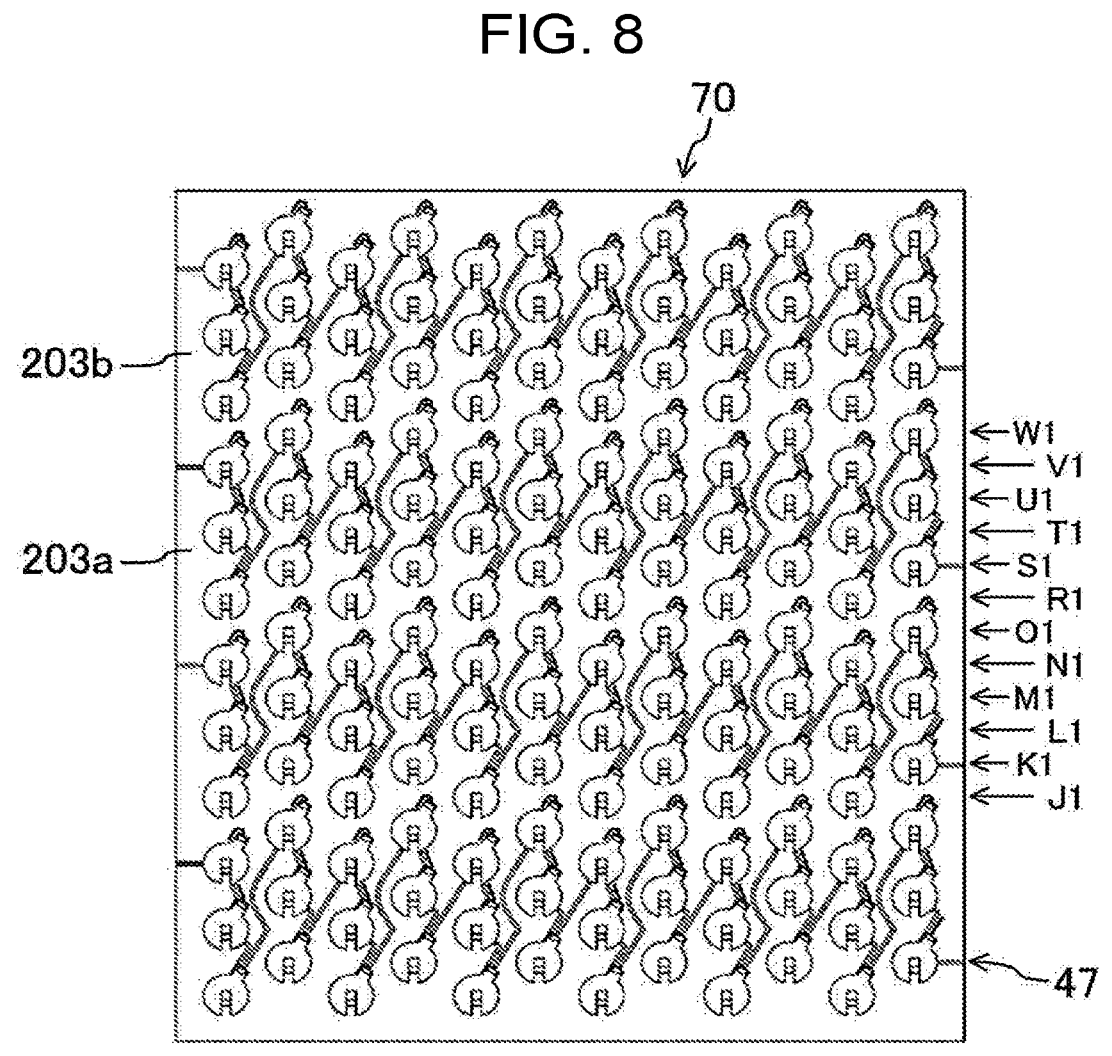

FIG. 8 shows conductive members 70, 203*a*, 203*b*, . . . according to the fourth exemplary embodiment.

In the present exemplary embodiment, there are formed a first battery block constituted by rows J1, K1, L1, M1, N1, and O1 and a second battery block constituted by rows R1, S1, T1, U1, V1, and W1, and six rows of cells 10 constitute one battery block.

In the first battery block, conductive member 203*a* connects negative electrode terminals of all of the cells of six rows J1, K1, L1, M1, N1, and O1. Further, in the second battery block, conductive member 203*a* connects positive electrode terminals of all of the cells of six rows R1, S1, T1, U1, V1, and W1. Further, in the second battery block, conductive member 203*b* connects negative electrode terminals of all of the cells of six rows R1, S1, T1, U1, V1, and W1.

Further, although not shown in the drawing, in the present exemplary embodiment, positive side electricity-collecting members and negative side electricity-collecting members extend in the direction perpendicular to the direction in which the positive side electricity-collecting members and the negative side electricity-collecting members extend in the first exemplary embodiment.

The present exemplary embodiment also provides the same effects as the first exemplary embodiment.

Fifth Exemplary Embodiment

In a fifth exemplary embodiment, there are used conductive members having different shapes from those in the first exemplary embodiment, but cells and the other parts are the same as in the first exemplary embodiment; therefore, the parts different from those in the first exemplary embodiment will be described below.

Figure 9:
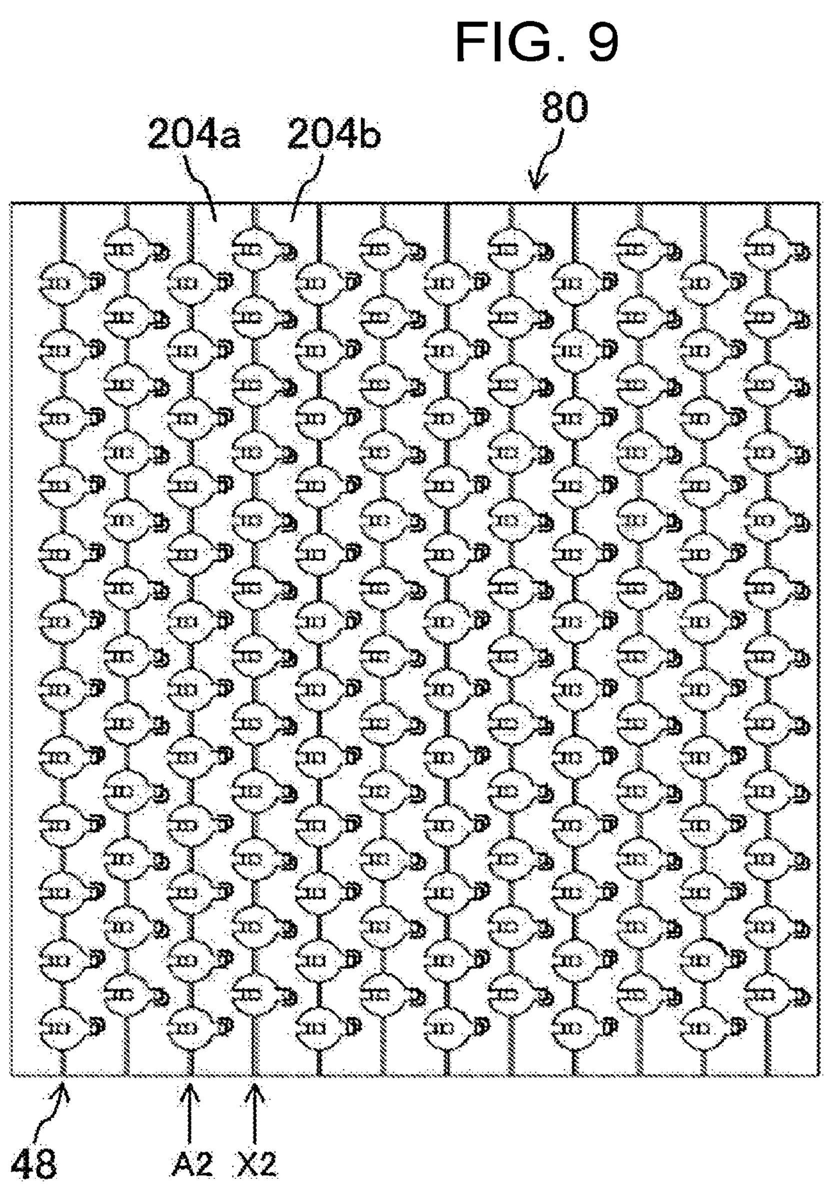
FIG. 9 is a plan view showing another example of the conductive members.

FIG. 9 shows conductive members 80, 204*a*, 204*b*, . . . according to the fifth exemplary embodiment.

In the present exemplary embodiment, there are formed a first battery block constituted by row A2 and a second battery block constituted by row X2, and one row of cells 10 constitutes one battery block.

In the first battery block, conductive member 204*a* connects negative electrode terminals of all of the cells of rows A2. Further, in the second battery block, conductive member 204*a* connects positive electrode terminals of all of the cells of row X2. Further, in the second battery block, conductive member 204*b* connects negative electrode terminals of all of the cells of row X2.

The present exemplary embodiment also provides the same effects as the first exemplary embodiment.

Sixth Exemplary Embodiment

In a sixth exemplary embodiment, there are used conductive members having different shapes from those in the second exemplary embodiment, but cells and the other parts are the same as in the second exemplary embodiment;

therefore, the parts different from those in the second exemplary embodiment will be described below.

Figure 10:
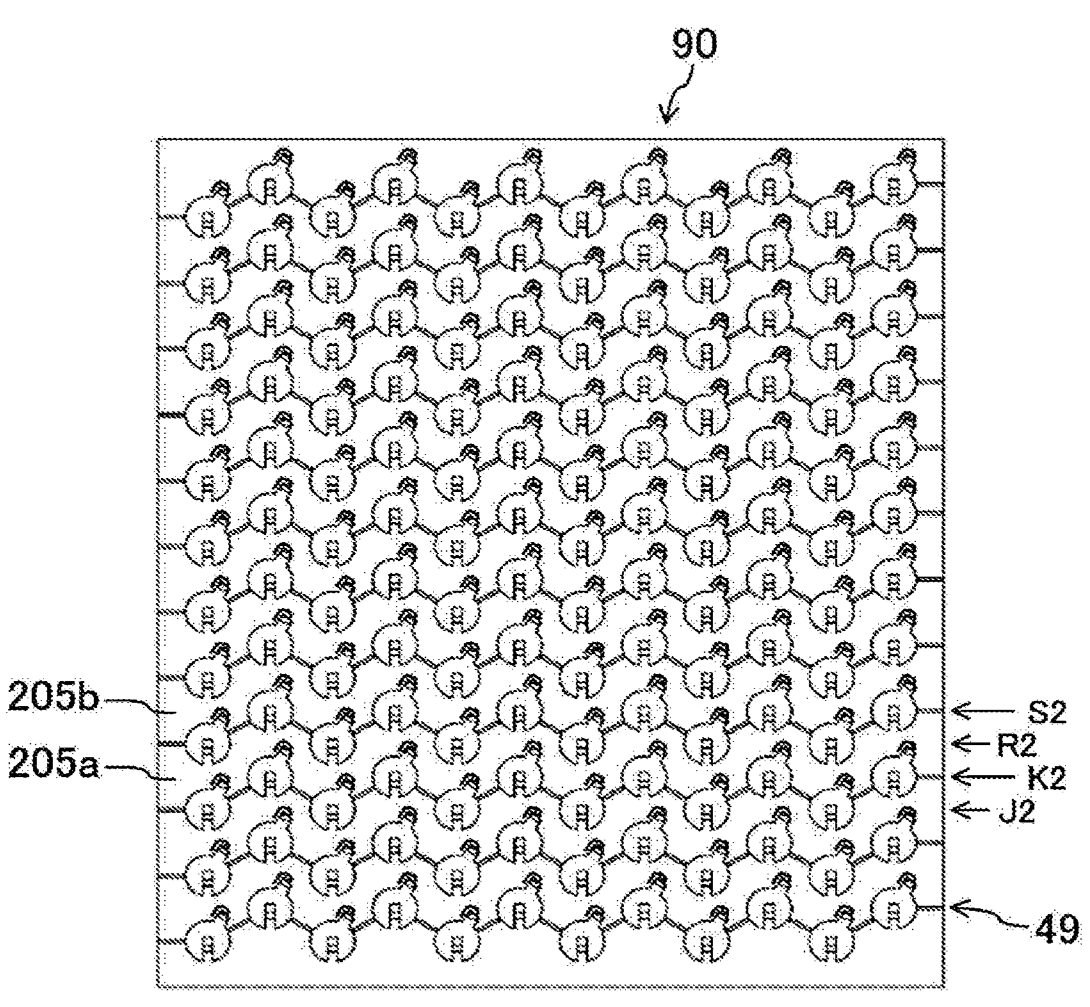
FIG. 10 is a plan view showing another example of the conductive members.

FIG. 10 shows conductive members 90, 205*a*, 205*b*, . . . according to the sixth exemplary embodiment.

In the present exemplary embodiment, there are formed a first battery block constituted by rows J2 and K2 and a second battery block constituted by rows R2 and S2, and two rows of cells 10 constitute one battery block.

In the first battery block, conductive member 205*a* connects negative electrode terminals of all of the cells of two rows J2 and K2. Further, in the second battery block, conductive member 205*a* connects positive electrode terminals of all of the cells of two rows R2 and S2. Further, in the second battery block, conductive member 205*b* connects negative electrode terminals of all of the cells of two rows R2 and S2.

Further, although not shown in the drawing, in the present exemplary embodiment, positive side electricity-collecting members and negative side electricity-collecting members extend in the direction perpendicular to the direction in which the positive side electricity-collecting members and the negative side electricity-collecting members extend in the first exemplary embodiment.

The present exemplary embodiment also provides the same effects as the first exemplary embodiment.

Other Exemplary Embodiments

The above-mentioned exemplary embodiments are examples of the present invention, and the present invention is not limited to these examples. These examples may be combined with or partially replaced by known arts, commonly used arts, or publicly-known arts. Further, a modified invention that a person skilled in the art can easily conceive is also contained in the present invention.

The insulating plate and the conductive members are preferably fixed to each other with an adhesive or the like. For example, in terms of manufacturing cost and accuracy, a method is preferable in which metal foil is bonded to an insulating plate having holes and the metal foil is processed by etching or the like to manufacture the conductive members.

The holes in the insulating plate can have any shape as long as the positive electrode terminals and the negative electrode terminals can be exposed.

A material and thickness of the conductive members can be appropriately set depending on settings of a capacity and a discharge rate of the battery module. Metal foil may be used, or a metal plate may be used.

The part taking a function of a fuse may be on the terminal connecting part on the positive electrode. Further, when a cross-sectional area of a current flow passage is set to less than or equal to a predetermined area to exert a fuse function, because the predetermined area different for each battery module, the predetermined area can be set in consideration of a number of cells in one row, a number of the rows constituting a battery block, the material, thickness, and area of each conductive member, the charge and discharge rate of the battery module, and the like.

The invention claimed is:

1. A battery module comprising:

a plurality of cells, each of the plurality of cells including a first electrode terminal and a second electrode terminal disposed on one end part of each of the plurality of cells, the second electrode terminal being located further from a center of the each of the plurality of cells than the first electrode terminal in a radius direction of the each of the plurality of cells, each of the plurality of cells has a cylindrical shape, the plurality of cells being arranged in such a manner that a plurality of one end parts of the plurality of cells are positioned on a same side; and a plate disposed above the plurality of one end parts of the plurality of cells, the plate including:

holes that are provided in the plate and through each of which the first electrode terminal and the second electrode terminal of each of the plurality of cells are exposed; and a plurality of conductive members disposed on a surface of the plate opposite to a surface facing the plurality of cells, wherein:

the plurality of conductive members includes a first conductive member and a second conductive member, the second conductive member includes terminal connecting parts extending into and passing through each of the holes, each of the holes has a circular portion and a protruding portion radially protruding from the circular portion along a first direction, a distal end of each of the terminal connecting parts of the second conductive member overlaps the circular portion of each of the holes, each of the terminal connecting parts of the second conductive member connects to the second terminal in each of the plurality of the cells, and the first conductive member includes terminal connecting parts, each of which extends along the first direction from an outside of the protruding portion into the protruding portion but does not extend into the circular portion of each of the holes.

2. The battery module according to claim 1, wherein:

each of the terminal connecting parts of the first conductive member connects to the first electrode terminal in each of the plurality of cells.

3. The battery module according to claim 2, wherein a distal end of each of the terminal connecting parts of the first conductive member connected to a corresponding one of the plurality of cells and the distal end of each of the terminal connecting parts of the second conductive member connected to the corresponding one of the plurality of cells are located within a same corresponding hole of the holes in plan view.

4. The battery module according to claim 1, wherein each of the terminal connecting parts of the second conductive member extends along the first direction.

* * * * *